United States Patent
Lin et al.

(10) Patent No.: US 10,118,193 B1
(45) Date of Patent: Nov. 6, 2018

(54) LIGHT CURING APPARATUS

(71) Applicant: ROLENCE ENTERPRISE INC., Taoyuan County (TW)

(72) Inventors: Wei-Ting Lin, Taoyuan County (TW); Kai-Chuan Hu, Taoyuan County (TW)

(73) Assignee: ROLENCE ENTERPRISE INC., Taoyuan County (TW)

( * ) Notice: Subject to any disclaimer, the term of this patent is extended or adjusted under 35 U.S.C. 154(b) by 0 days.

(21) Appl. No.: 15/650,181

(22) Filed: Jul. 14, 2017

(51) Int. Cl.
| | |
|---|---|
| *B05D 3/06* | (2006.01) |
| *G02B 6/10* | (2006.01) |
| *H02K 99/00* | (2014.01) |
| *B29C 35/02* | (2006.01) |
| *G02B 6/42* | (2006.01) |
| *B29C 35/08* | (2006.01) |

(52) U.S. Cl.
CPC .............. *B05D 3/061* (2013.01); *B29C 35/02* (2013.01); *G02B 6/102* (2013.01); *G02B 6/4259* (2013.01); *H02K 99/20* (2016.11); *B29C 2035/0827* (2013.01)

(58) Field of Classification Search
CPC ........ B05D 3/061; H02K 99/20; B29C 35/02; B29C 2035/0827; G02B 6/102; G02B 6/4259
See application file for complete search history.

(56) References Cited

U.S. PATENT DOCUMENTS

| | | | | |
|---|---|---|---|---|
| 6,673,278 B1* | 1/2004 | Buazza | ................... | B29C 35/08 264/1.38 |
| 2003/0049344 A1* | 3/2003 | Foreman | ............. | B29C 35/0805 425/174.4 |
| 2003/0214060 A1* | 11/2003 | Wires | ................... | B29C 31/041 351/159.62 |
| 2010/0252753 A1* | 10/2010 | Wang | ................... | A61C 19/003 250/492.1 |
| 2011/0277338 A1* | 11/2011 | Li | ............................ | F26B 3/28 34/275 |

* cited by examiner

*Primary Examiner* — David E Smith
(74) *Attorney, Agent, or Firm* — Li & Cai Intellectual Property (USA) Office

(57) ABSTRACT

A light curing apparatus includes a chassis, a carrier, a driving mechanism, and a bottom light curing module. The chassis includes a box and a partition arranged in the box to define a curing space and a receiving space. The carrier is translucent and is arranged in the curing space. The driving mechanism is connected to the carrier to rotate the carrier. The bottom light curing module is arranged in the receiving space and includes a plurality of light curing units. The light curing units of the bottom light curing module are configured to emit a curing light onto at least 80% of the carrier, when the driving mechanism drives the carrier to rotate.

11 Claims, 12 Drawing Sheets

LIGHT CURING APPARATUS

BACKGROUND OF THE INVENTION

1. Field of the Invention

The present disclosure relates to a curing apparatus; in particular, to a light curing apparatus.

2. Description of Related Art

When a conventional light curing apparatus is used to implement a curing process, the conventional light curing apparatus emits a curing light onto a side portion of a curable object, so that the curing speed of a bottom portion of the curable object is slower than that of the other portion of the curable object. Thus, some drawbacks (e.g., deformation or warpage) may easily occur in the curing process implemented by using the conventional light curing apparatus.

SUMMARY OF THE INVENTION

The present disclosure provides a light curing apparatus to effectively improve the drawbacks associated with conventional light curing apparatuses.

The present disclosure discloses a light curing apparatus including a chassis, a translucent carrier, a driving mechanism, and a bottom light curing module. The chassis includes a box and a partition arranged in the box. The partition is configured to divide a space surroundingly defined by the box into a curing space and a receiving space. The carrier is arranged in the curing space, the driving mechanism is connected to the carrier, and the driving mechanism is configured to drive the carrier to rotate. The bottom light curing module is arranged in the receiving space and includes a plurality of light curing units. The light curing units of the bottom light curing module are configured to emit a curing light onto at least 80% of the carrier, when the driving mechanism drives the carrier to rotate.

In summary, the light curing apparatus in the present disclosure is provided with the bottom light curing module to increase the curing speed of the bottom portion of the curable object, so that the drawbacks (e.g., deformation or warpage) associated with the bottom portion of the curable object can be avoided, when the curable object is in a curing process by using the light curing apparatus.

In order to further appreciate the characteristics and technical contents of the present disclosure, references are hereunder made to the detailed descriptions and appended drawings in connection with the present disclosure. However, the appended drawings are merely shown for exemplary purposes, and should not be construed as restricting the scope of the present disclosure.

DETAILED DESCRIPTION OF THE PREFERRED EMBODIMENTS

Reference is made to FIGS. 1 to 12, which illustrate the present disclosure. References are hereunder made to the detailed descriptions and appended drawings in connection with the present disclosure. However, the appended drawings are merely provided for exemplary purposes, and should not be construed as restricting the scope of the present disclosure.

[First Embodiment]

Figure 1:
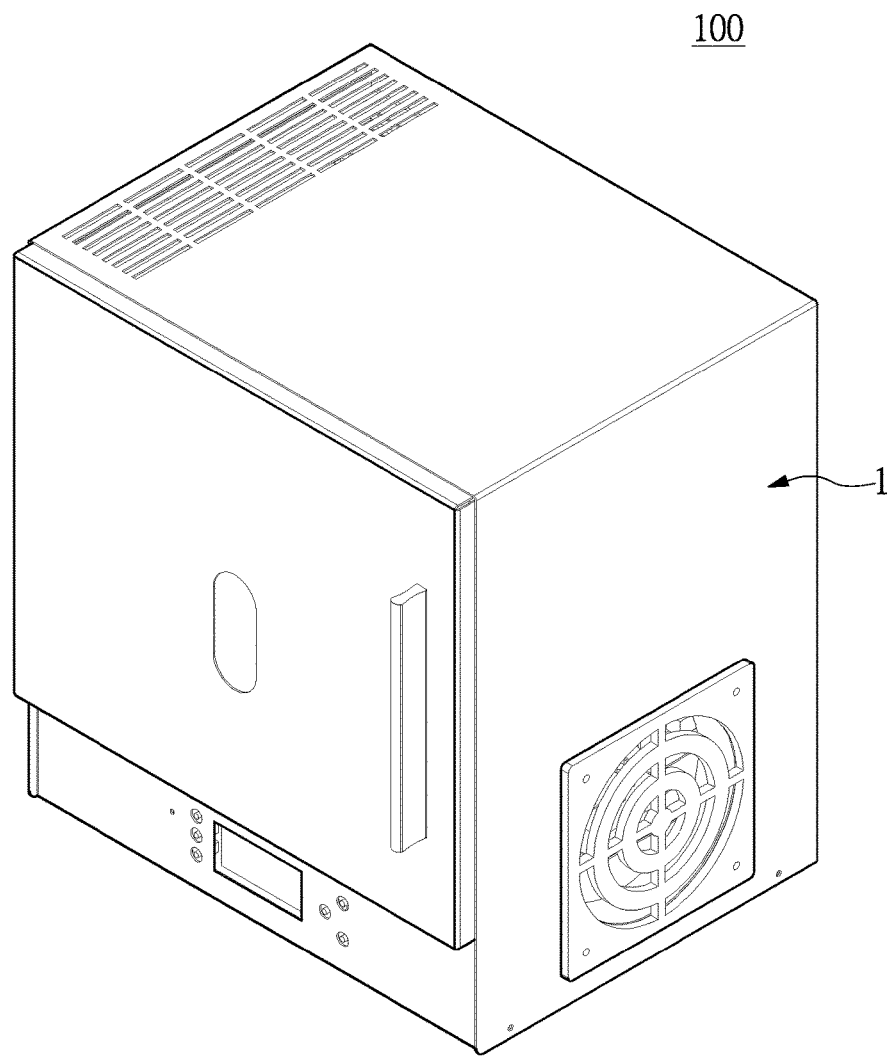
FIG. 1 is a perspective view showing a light curing apparatus according to a first embodiment of the present disclosure.
Figure 2:
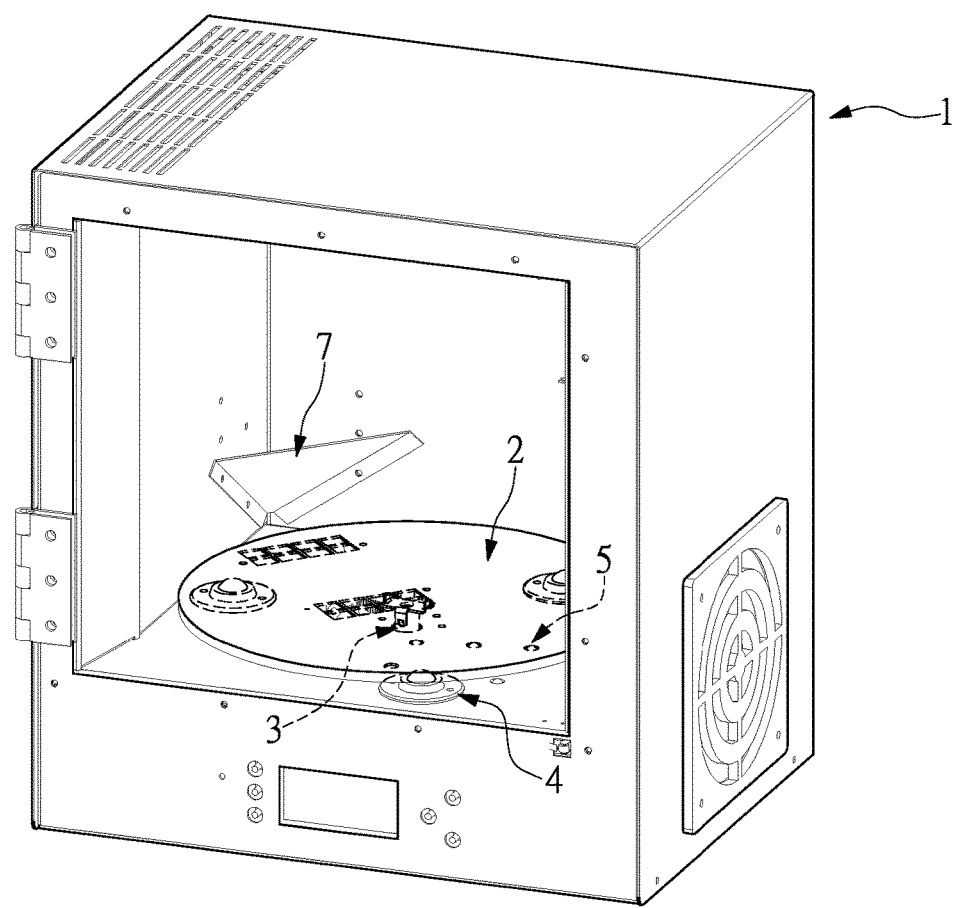
FIG. 2 is a perspective view showing a part of FIG. 1 with a door of a box omitted.
Figure 3:
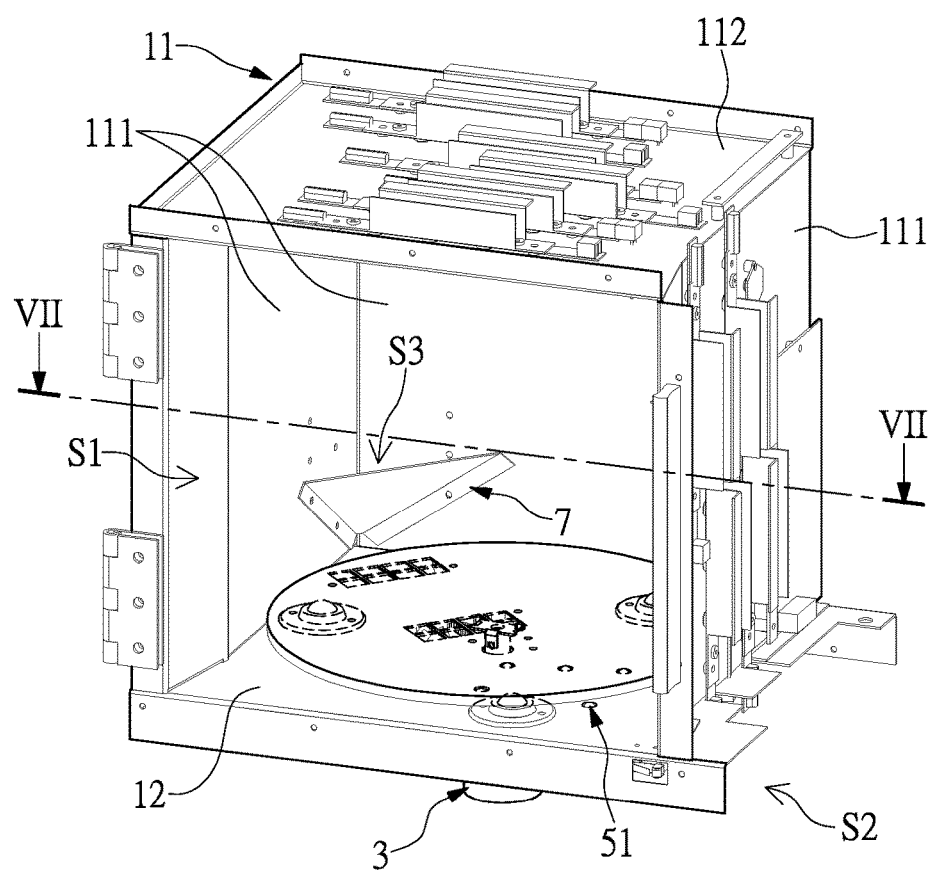
FIG. 3 is a perspective view showing a part of FIG. 2 with a part of the box omitted.
Figure 4:
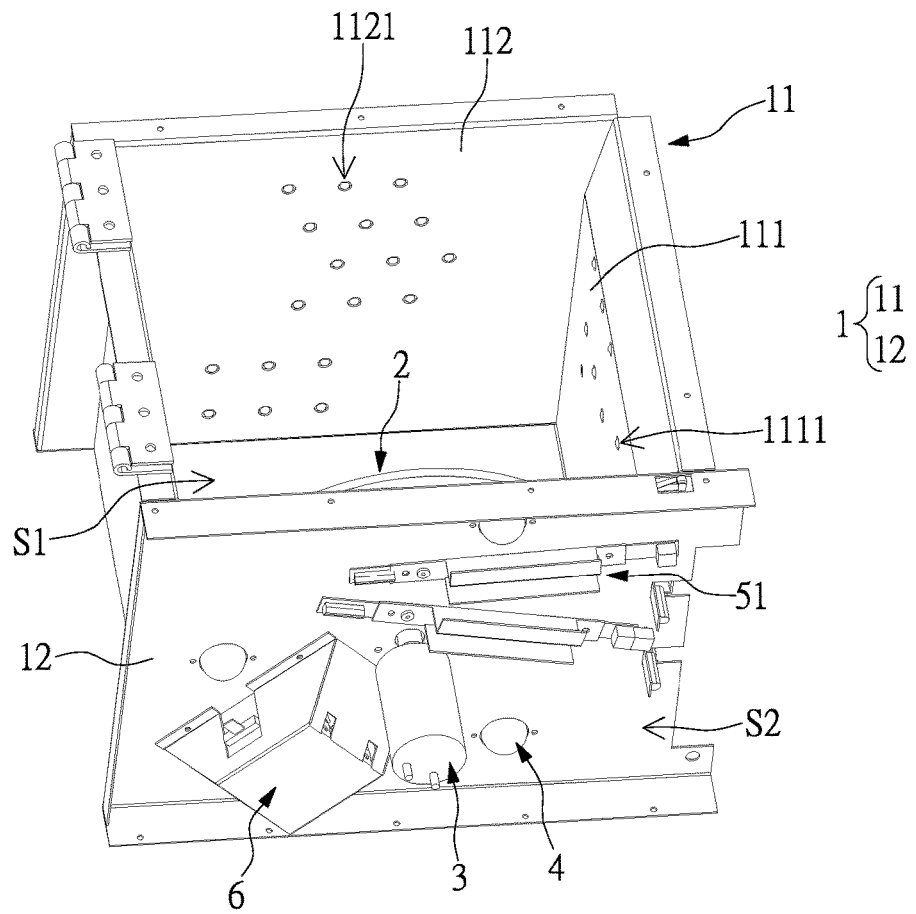
FIG. 4 is a perspective view showing a part of FIG. 2 with a part of the box omitted from another perspective.

Reference is made to FIGS. 1 to 8, which illustrate a first embodiment of the present disclosure. As shown in FIGS. 1 to 4, the present embodiment discloses a light curing apparatus 100. The light curing apparatus 100 includes a chassis 1, a disk-like carrier 2 arranged in the chassis 1, a driving mechanism 3 connected to the carrier 2, a plurality of limiting mechanisms 4 (i.e., universal balls 4) disposed on the chassis 1 and supporting the carrier 2, a light curing device 5 disposed on the chassis 1, a heating device 6 (as shown in FIG. 4), and a guiding member 7, the latter two of which are arranged in the chassis 1 and correspond in position to each other.

It should be noted that the components of the light curing apparatus 100 in the present embodiment can be adjusted according to practical needs. The following description discloses the structure and connection relationships of each component of the light curing apparatus 100.

Figure 5:
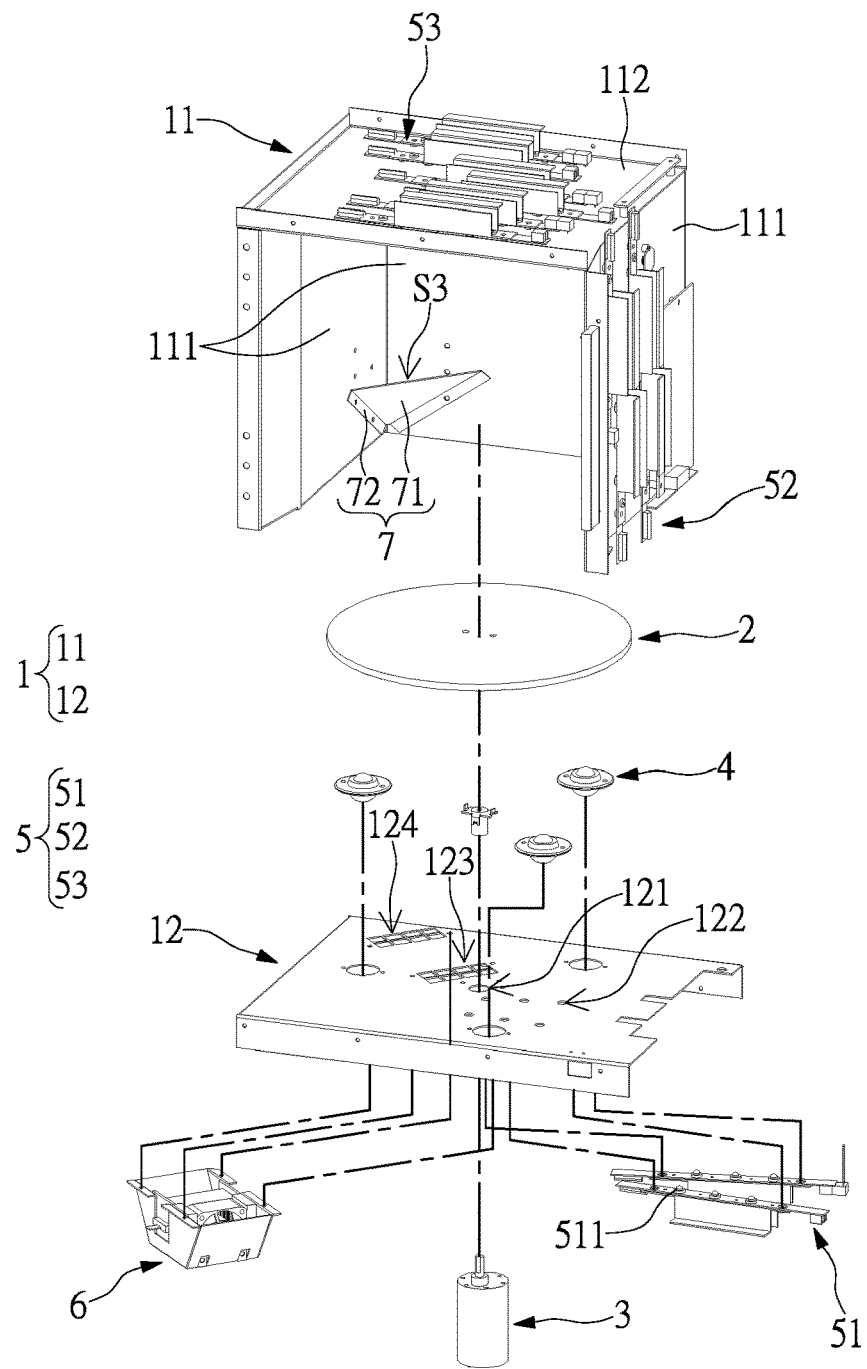
FIG. 5 is an exploded view of FIG. 3.
Figure 6:
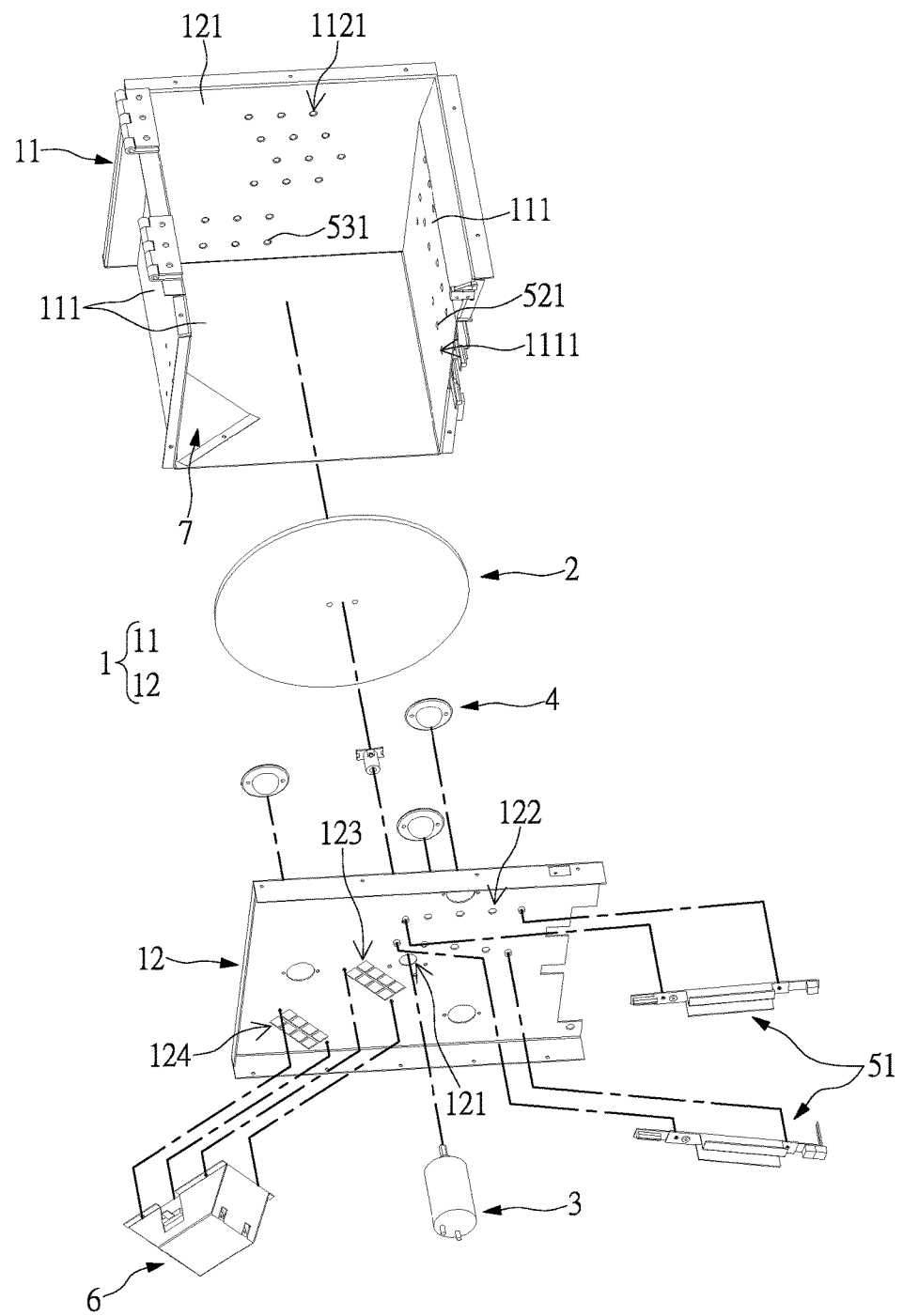
FIG. 6 is an exploded view of FIG. 4.

As shown in FIGS. 4 to 6, the chassis 1 includes a box 11 and a plate-like partition 12 arranged in the box 11. The partition 12 is configured to divide a space which is surroundingly defined by the box 11, into a curing space S1 and a receiving space S2 (as shown in FIG. 3). The curing space S1 is located above the receiving space S2, and a volume of the curing space S1 is preferably larger than that of the receiving space S2, but the present disclosure is not limited thereto.

The box 11 includes a plurality of side plates 111 and a top plate 112 disposed on the side plates 111. The side plates 111 and the top plate 112 in the present embodiment are the inner plates of the box 11 fastened to the partition 12 (i.e., the three side plates 111 are jointly formed in an U shape and are connected to an outer portion of the partition 12 as shown in FIG. 3), so that the side plates 111, the top plates 112, and the partition 12 surroundingly co-define the curing space S1. At least one of the side plates 111 (i.e., the right side plate 111 as shown in FIG. 6) has a plurality of thru-holes 1111, and the top plate 112 has a plurality of thru-holes 1121.

The partition 12 has a central hole 121, a plurality of thru-holes 122 arranged at one side of the central hole 121 (i.e., the lower right side of the central hole 121 as shown in FIG. 5), at least one inlet 123, and at least one outlet 124, the latter two of which are arranged at another side of the central hole 121 (i.e., the upper left side of the central hole 121 as shown in FIG. 5). The curing space S1 and the receiving space S2 are in air communication with each other through the central hole 121, the thru-holes 122, the inlet 123, and the outlet 124.

The carrier 2 is translucent (i.e., is preferably transparent) and is arranged in the curing space S1 of the chassis 1. A top surface of the carrier 2 is configured to carry a curable object (not shown). The driving mechanism 3 is exemplified as a motor and is approximately arranged in the receiving space S2. A shaft of the driving mechanism 3 passes through the central hole 121 of the partition 12 to connect to a center of the carrier 2, so that the driving mechanism 3 can drive the carrier 2 to rotate. The universal balls 4 are mounted on the partition 12 and are arranged in the curing space S1, and the universal balls 4 support a bottom surface of the carrier 2, so that the carrier 2 can be stably rotated.

Figure 7:
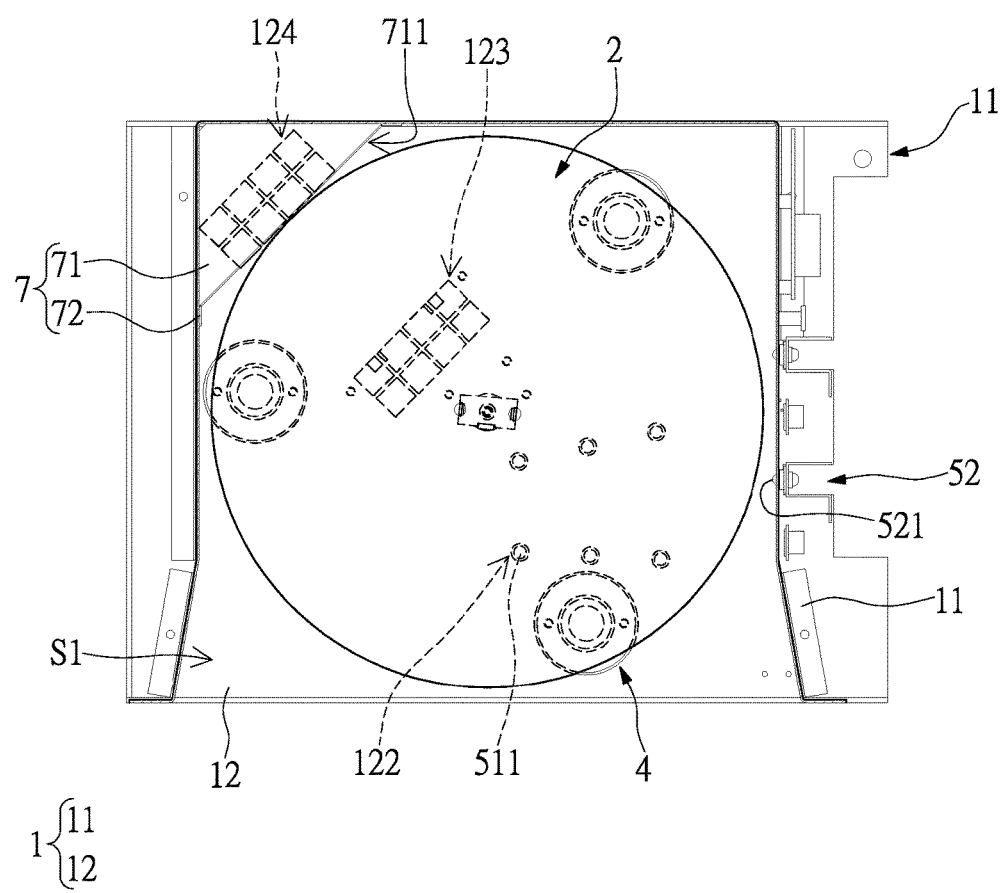
FIG. 7 is a cross-sectional view taken along a cross-sectional line VII-VII of FIG. 3.

Specifically, as shown in FIG. 7, the carrier 2 in the present embodiment has a circular shape. The inlet 123 is arranged in a projecting region defined by orthogonally projecting the carrier 2 onto the partition 12, and the outlet 124 is arranged outside of the projecting region defined by orthogonally projecting the carrier 2 onto the partition 12. Moreover, the carrier 2 can be defined as four quadrants, and the inlet 123 and the thru-holes 122 are respectively shielded by two diagonal quadrants of the four quadrants of the carrier 2.

As shown in FIGS. 4 to 6, the light curing device 5 is mounted on the chassis 1 and is configured to emit a curing light toward the curing space S1. The light curing device 5 in the present embodiment includes a bottom light curing module 51, a side light curing module 52, and a top light curing module 53.

The bottom light curing module 51 is arranged in the receiving space S2 of the chassis 1, and is fixed on the bottom surface of the partition 12. The bottom light curing module 51 includes a plurality of light curing units 511 respectively corresponding in position to the thru-holes 122 of the partition 12. Specifically, each of the light curing units 511 at least partially passes through the corresponding thru-hole 122. In other words, a projecting region defined by orthogonally projecting the light curing units 511 onto the carrier 2 is arranged in a quarter of the circular shape of the carrier 2 (as shown in FIG. 7), but the present disclosure is not limited thereto.

Moreover, the light curing units 511 of the bottom light curing module 51 are configured to emit a curing light onto at least 80% of the carrier 2 (i.e., is preferably 100%), when the driving mechanism 3 drives the carrier 2 to rotate, so that the curing light can pass through the carrier 2 to travel onto a bottom portion of the curable object disposed on the carrier 2.

Thus, the light curing apparatus 100 in the present embodiment is provided with the bottom light curing module 51 to increase the curing speed of the bottom portion of the curable object, so that the drawbacks (e.g., deformation or warpage) associated with the bottom portion of the curable object can be avoided, when the curable object is in a curing process by using the light curing apparatus 100.

Specifically, each of the light curing units 511 is configured to emit a curing light having a wavelength within a range of 280~500 nm, but the present disclosure is not limited thereto. For example, the light curing units 511 of the bottom light curing module 51 can be configured to emit different curing lights having at least two different wavelengths (e.g., UVA, UVB, or UVC). The light curing units 511 of the bottom light curing module 51 can selectively emit a curing light having one of the at least two wavelengths onto at least 80% of the carrier 2, when the driving mechanism 3 drives the carrier 2 to rotate. The wavelength of the curing light emitted from each of the light curing units 511 can be adjusted according to the material of the curable object.

Moreover, the light curing units 511 of the bottom light curing module 51 can simultaneously emit the different curing lights to overlap the at least two different wavelengths, so that the bottom light curing module 51 can emit a mixed curing light having a large wavelength band. Accordingly, the bottom light curing module 51 can be used to cure different curable objects, which are cured by different curing lights.

In addition, the light curing units 511 in the present embodiment respectively pass through the thru-holes 122 of the partition 12, but the present disclosure is not limited thereto. For example, in other embodiments of the present disclosure, a portion of the partition 12 corresponding in position to the light curing units 511 is translucent, so that curing light emitted from each of the light curing units 511 can pass through the portion of the partition 12 and the carrier 2 to travel onto the bottom portion of the curable object disposed on the carrier 2.

As shown in FIGS. 4 to 6, the side light curing module 52 is disposed on at least one of the side plates 111 (e.g., the right side plate 111 as shown in FIG. 5), and the side light curing module 52 is configured to emit a curing light toward the curing space S1 of the chassis 1. The side light curing module 52 includes a plurality of light curing units 521, and the light curing units 521 respectively and at least partially pass through the thru-holes 1111 of the corresponding side plate 111. Moreover, the top light curing module 53 is disposed on the top plate 112, and the top light curing module 53 are configured to emit a curing light toward the curing space S1 of the chassis 1. The top light curing module 53 includes a plurality of light curing units 531, and the light curing units 531 respectively and at least partially pass through the thru-holes 1121 of the top plate 112.

It should be noted that the structure of each of the light curing units 521, 531 of the side light curing module 52 and the top light curing module 53 in the present embodiment is substantially identical to the structure of each of the light curing units 511 of the bottom light curing module 51, but the present disclosure is not limited thereto.

Figure 8:
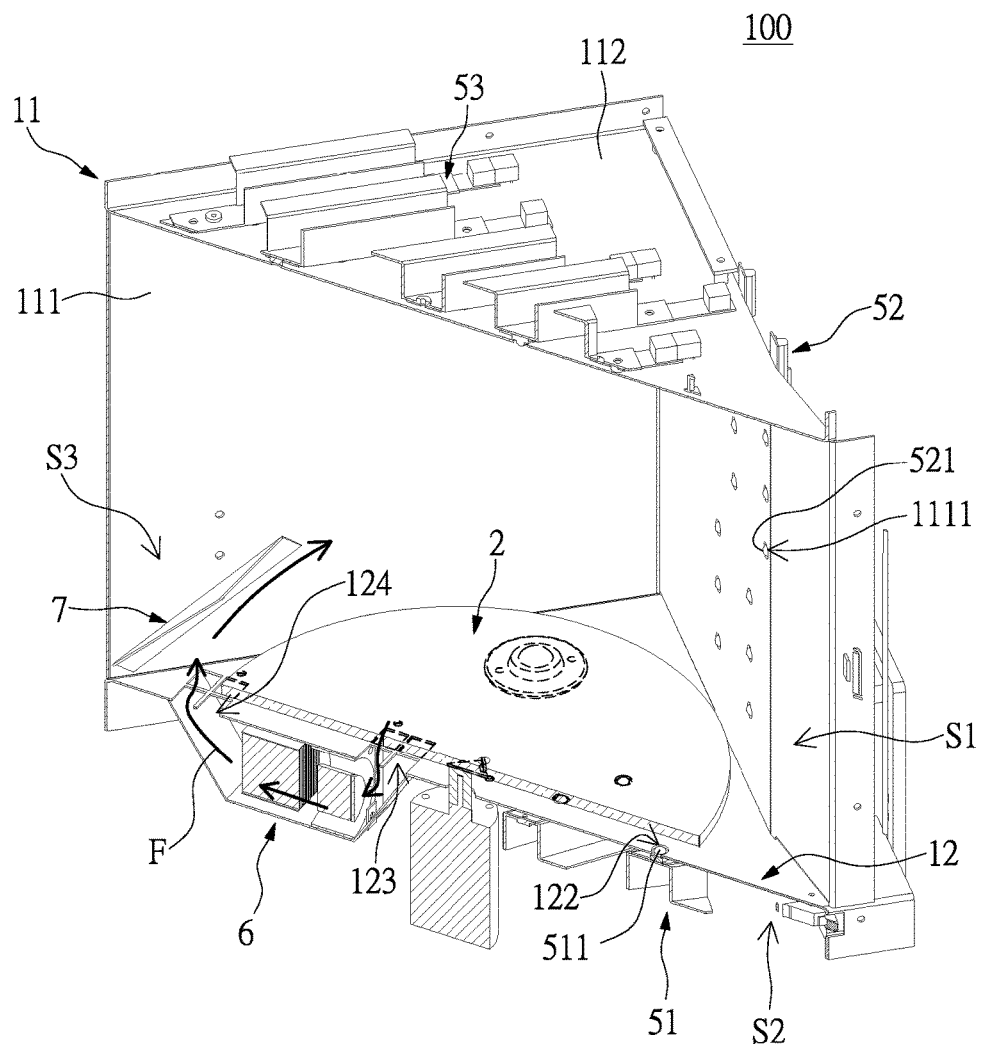
FIG. 8 is a perspective cross-sectional view of FIG. 3.
Figure 9:
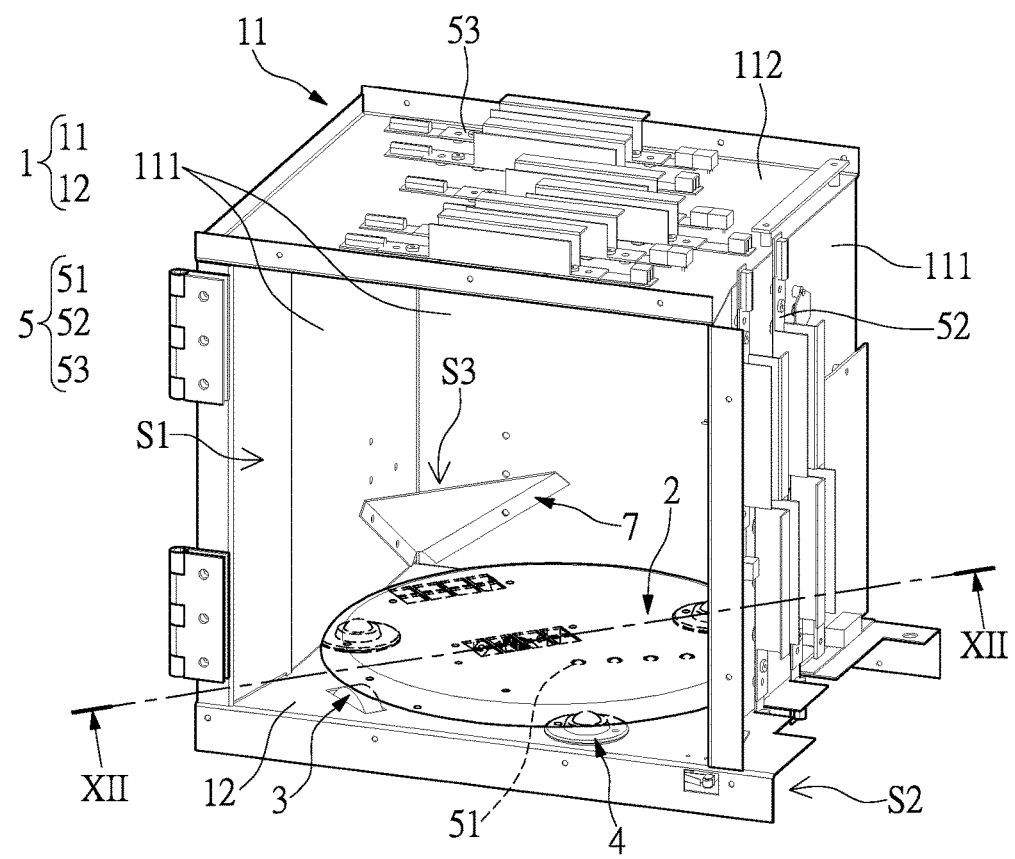
FIG. 9 is a perspective view showing the light curing apparatus with a part of the box omitted according to a second embodiment of the present disclosure.
Figure 10:
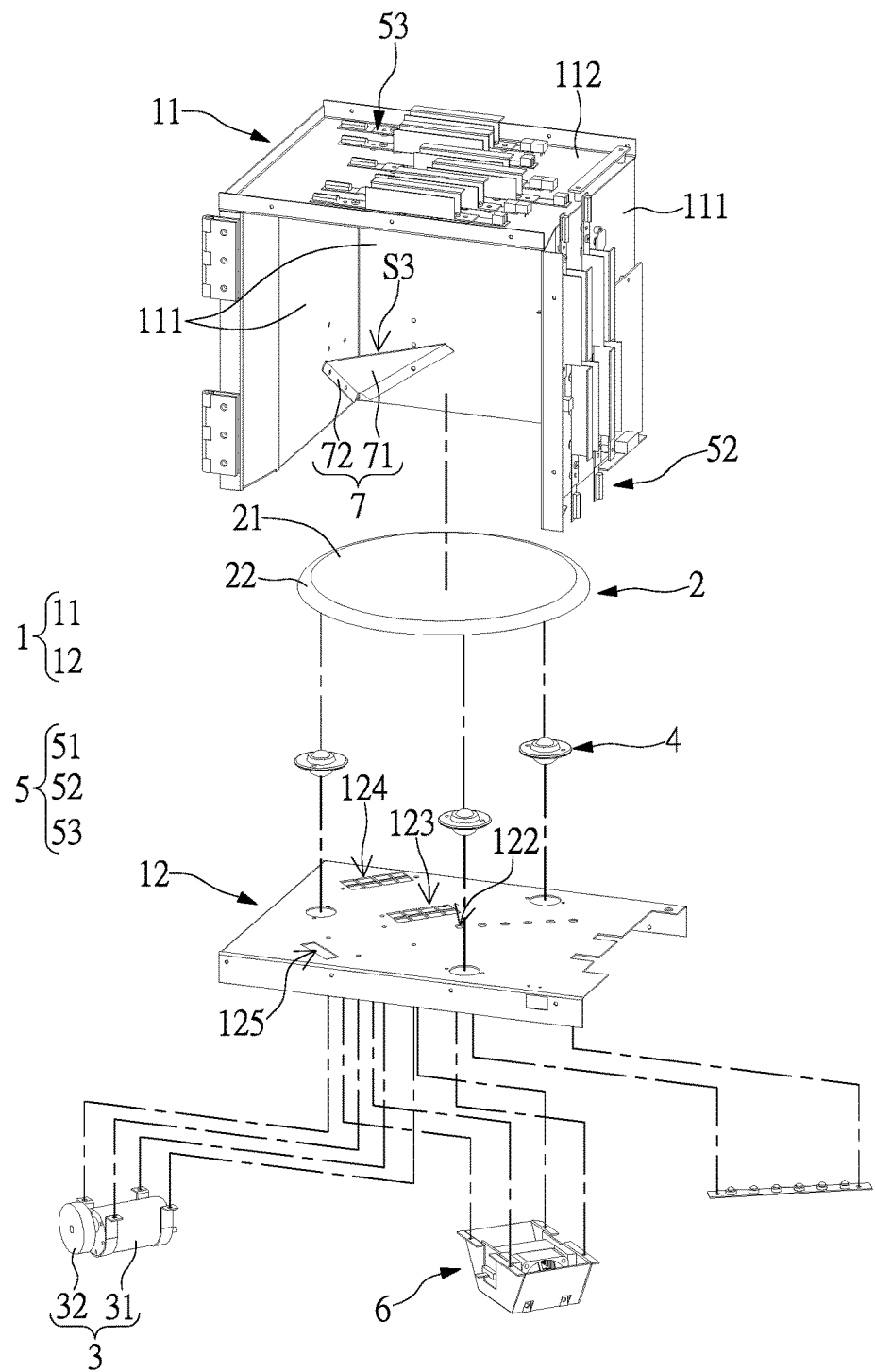
FIG. 10 is an exploded view of FIG. 9.
Figure 11:
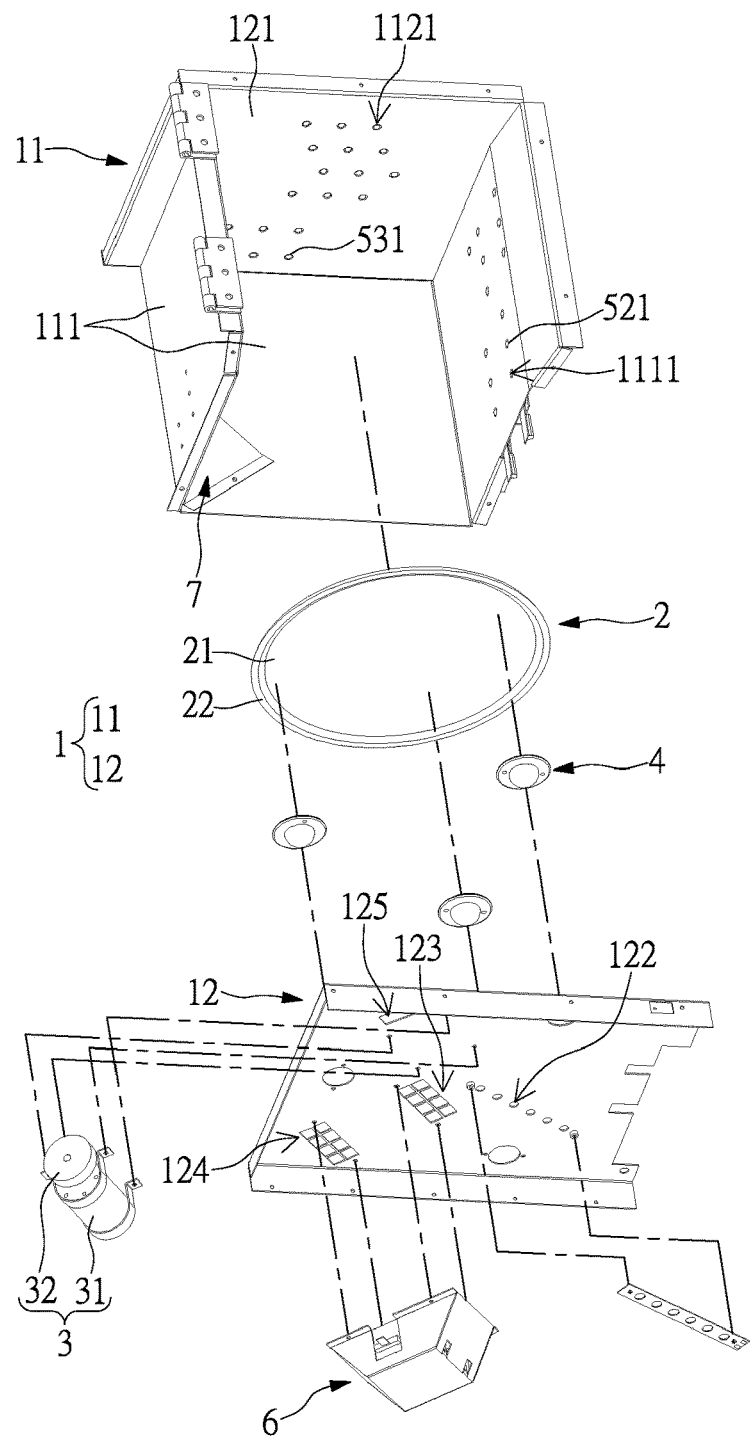
FIG. 11 is an exploded view of FIG. 9 from another perspective.
Figure 12:
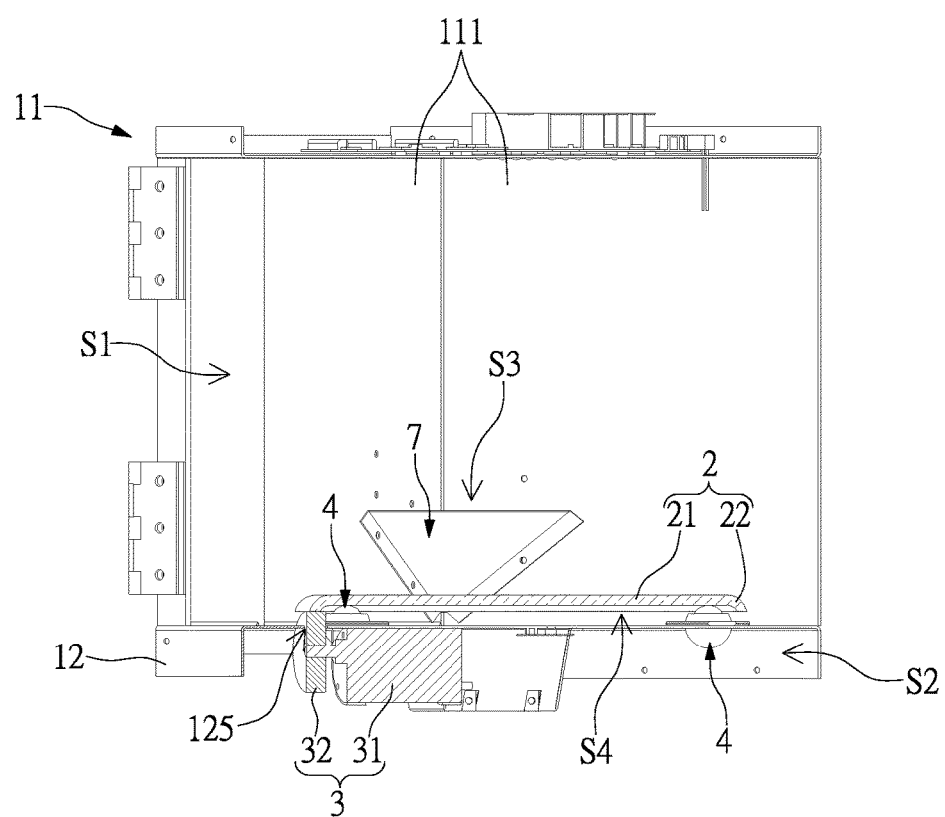
FIG. 12 is a cross-sectional view taken along a cross-sectional line XII-XII of FIG. 9.

As shown in FIGS. 4 and 8, the heating device 6 is arranged in the receiving space S2 of the chassis 1 and is fixed on the bottom surface of the partition 12. The heating device 6 and the bottom light curing module 51 in the present embodiment are respectively located at two opposite sides of the driving mechanism 3. The heating device 6 is configured to intake air from the curing space S1 through the inlet 123 and to exhaust the heated air to the curing space S1 through the outlet 124. Moreover, the heating device 6 is configured to exhaust air through the outlet 124 in a predetermined airflow direction F.

As shown in FIGS. 5, 7, and 8, the guiding member 7 is arranged in the curing space S1 of the chassis 1. The guiding member 7 is arranged in the predetermined airflow direction F to guide air, which is exhausted from the outlet 124 of the heating device 6, thereby changing the predetermined airflow direction F. Thus, the heated air exhausted from the outlet 124 of the heating device 6 can be guided by the guiding member 7, thereby adjusting the predetermined airflow direction F. Thus, an inner temperature distribution of the curing space S1 becomes more uniform to improve the performance of the curing process implemented by the light curing apparatus 100.

In the present embodiment, the guiding member 7 includes a triangular guiding plate 71 and two connecting portions 72 respectively connected to two edges of the guiding plate 71. The two connecting portions 72 of the guiding member 7 are respectively fixed on two adjacent side plates 111 (i.e., the left side plate 111 and the rear side plate 111 as shown in FIG. 5), which are connected to each other. The guiding member 7 and the two adjacent side plates 111 surroundingly co-define a triangular pyramid space S3, and a cross-sectional area of the triangular pyramid space S3 gradually increases in a direction from the partition 12 to the top plate 112 (i.e., a direction from a lower side to an upper side as shown in FIG. 5). Moreover, the guiding member 7 of the light curing apparatus 100 in the present embodiment can be changed according to practical needs, thereby satisfying different curable objects, which are suitable to different temperature distributions.

Specifically, an edge of a projecting region defined by orthogonally projecting the guiding member 7 onto the partition 12 (i.e., the edge 711 of the guiding plate 71 between the two connecting portions 72 as shown in FIG. 7) is a tangent line of the projecting region defined by orthogonally projecting the carrier 2 onto the partition 12, but the present disclosure is not limited thereto.

In addition, the outlet 124 in the present embodiment is arranged outside of the projecting region defined by orthogonally projecting the carrier 2 onto the partition 12, and is arranged in the projecting region defined by orthogonally projecting the guiding member 7 onto the partition 12, but the present disclosure is not limited thereto. For example, in other embodiments of the present disclosure, at least a part of the outlet 124 can be arranged in the projecting region defined by orthogonally projecting the carrier 2 onto the partition 12, but the bottom surface of the carrier 2 needs to be arranged outside of the predetermined airflow direction F, when the heating device 6 exhausts air through the outlet 124.

[Second Embodiment]

Reference is made to FIGS. 9 to 12, which illustrate a second embodiment of the present disclosure. The present embodiment is similar to the first embodiment. The difference between the present embodiment and the first embodiment is disclosed as follows.

The carrier 2 in the present embodiment is transparent and includes a circular plate-like carrying portion 21 and an annular flange 22 downwardly extending from a peripheral edge of the carrying portion 21. The carrying portion 21 and the flange 22 surroundingly co-define a limiting space S4. The carrier 2 is disposed on the limiting mechanisms 4 (i.e., universal balls 4). A portion of each of the limiting mechanisms 4 is arranged in the limiting space S4 and is abutted against an inner edge of the annular flange 22, so that the carrying portion 21 cannot be moved on a horizontal plane by the limiting mechanisms 4.

The driving mechanism 3 is abutted against the annular flange 22 to drive the carrier 2 to rotate. That is to say, the driving mechanism 3 in the present embodiment is not connected to the center of the carrier 2 (i.e., a center of circle of the carrying portion 21), so that the bottom light curing module 51 can emit a curing light to travel onto the center of the curable object, thereby increasing the curing performance of the curable object.

Specifically, the partition 12 of the present embodiment is not provided with the central hole 121, and the partition 12 has an opening 125 corresponding in position to a part of the annular flange 22. The driving mechanism 3 includes a motor 31 and a friction wheel 32 installed on the motor 31. The motor 31 is fastened to the bottom surface of the partition 12, and a part of the friction wheel 32 passes through the opening 125 of the partition 12 to abut against a bottom end of the annular flange 22. Thus, the friction wheel 32 of the driving mechanism 3 is rotatable to rub the bottom end of the annular flange 22, thereby rotating the carrier 2 along the center of circle of the carrying portion 21.

[The possible effects of the present disclosure]

In summary, the light curing apparatus in the present disclosure is provided with the bottom light curing module to increase the curing speed of the bottom portion of the curable object, so that the drawbacks (e.g., deformation or warpage) associated with the bottom portion of the curable object can be avoided, when the curable object is in a curing process by using the light curing apparatus.

Moreover, the heated air exhausted from the outlet of the heating device can be guided by the guiding member, thereby adjusting the predetermined airflow direction. Thus, an inner temperature distribution of the curing space becomes more uniform to improve the performance of the curing process implemented by the light curing apparatus. The guiding member of the light curing apparatus in the present disclosure can be changed according to practical needs, thereby satisfying different curable objects, which are suitable to different temperature distributions.

In addition, the driving mechanism is abutted against the annular flange to drive the carrier to rotate, and the driving mechanism is not connected to the center of the carrier, so that the bottom light curing module can emit a curing light to travel onto the center of the curable object, thereby increasing the curing performance of the curable object.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A light curing apparatus, comprising:
    a chassis including a box and a partition arranged in the box, wherein the partition is configured to divide a space surroundingly defined by the box into a curing space and a receiving space;
    a translucent carrier and a driving mechanism, wherein the carrier is arranged in the curing space, the driving mechanism is connected to the carrier, and the driving mechanism is configured to drive the carrier to rotate; and
    a bottom light curing module arranged in the receiving space and including a plurality of light curing units, wherein the light curing units of the bottom light curing module are configured to emit a curing light onto at least 80% of the carrier, when the driving mechanism drives the carrier to rotate,
    wherein the partition has a plurality of thru-holes, the curing space and the receiving space are in air communication with each other through the thru-holes, and the light curing units respectively correspond in position to the thru-holes.

2. The light curing apparatus as claimed in claim 1, wherein the bottom light curing module is fixed on a bottom surface of the partition, and each of the light curing units at least partially passes through the corresponding thru-hole.

3. The light curing apparatus as claimed in claim 1, wherein each of the light curing units is configured to emit a curing light having a wavelength within a range of 280~500 nm.

4. The light curing apparatus as claimed in claim 3, wherein the light curing units are configured to emit different curing lights having at least two different wavelengths, wherein the light curing units of the bottom light curing module are configured to selectively emit a curing light having one of the at least two wavelengths onto at least 80% of the carrier, when the driving mechanism drives the carrier to rotate.

5. The light curing apparatus as claimed in claim 1, wherein the carrier has a circular shape, and a projecting region defined by orthogonally projecting the light curing units onto the carrier is arranged in a quarter of the circular shape of the carrier.

6. The light curing apparatus as claimed in claim 1, further comprising a plurality of limiting mechanisms disposed on the partition, wherein the carrier includes a plate-like carrying portion and an annular flange extending from a peripheral edge of the carrying portion, the carrying portion and the flange surroundingly co-define a limiting space, the driving mechanism is movably abutted against the annular flange to drive the carrier to rotate, and a portion of each of the limiting mechanisms is arranged in the limiting space and is abutted against an inner edge of the annular flange.

7. The light curing apparatus as claimed in claim 1, wherein the box includes a plurality of side plates and a top plate disposed on the side plates, and the side plates, the top plate, and the partition surroundingly co-define the curing space, wherein the light curing apparatus comprises a side light curing module and a top light curing module, the side light curing module is disposed on at least one of the side plates, the top light curing module is disposed on the top plate, and the side light curing module and the top light curing module are configured to emit a curing light toward the curing space.

8. The light curing apparatus as claimed in claim 1, wherein the partition has at least one inlet and at least one outlet, and the curing space and the receiving space are in air communication with each other through the least one inlet and the at least one outlet, wherein the light curing apparatus comprises a heating device arranged in the receiving space, and the heating device is configured to intake air from the at least one inlet and to exhaust air through the at least one outlet.

9. The light curing apparatus as claimed in claim 8, wherein the heating device and the bottom light curing module are respectively located at two opposite sides of the driving mechanism, the at least one inlet is arranged in a projecting region defined by orthogonally projecting the carrier onto the partition, and the at least one outlet is arranged outside of the first projecting region defined by orthogonally projecting the carrier onto the partition.

10. A light curing apparatus, comprising:
a chassis including a box and a partition arranged in the box, wherein the partition is configured to divide a space surroundingly defined by the box into a curing space and a receiving space;
a translucent carrier and a driving mechanism, wherein the carrier is arranged in the curing space, the driving mechanism is connected to the carrier, and the driving mechanism is configured to drive the carrier to rotate; and
a bottom light curing module arranged in the receiving space and including a plurality of light curing units, wherein the light curing units of the bottom light curing module are configured to emit a curing light onto at least 80% of the carrier, when the driving mechanism drives the carrier to rotate,
wherein the carrier has a circular shape, and a projecting region defined by orthogonally projecting the light curing units onto the carrier is arranged in a quarter of the circular shape of the carrier.

11. A light curing apparatus, comprising:
a chassis including a box and a partition arranged in the box, wherein the partition is configured to divide a space surroundingly defined by the box into a curing space and a receiving space;
a translucent carrier and a driving mechanism, wherein the carrier is arranged in the curing space, the driving mechanism is connected to the carrier, and the driving mechanism is configured to drive the carrier to rotate; and
a bottom light curing module arranged in the receiving space and including a plurality of light curing units, wherein the light curing units of the bottom light curing module are configured to emit a curing light onto at least 80% of the carrier, when the driving mechanism drives the carrier to rotate,
wherein the partition has at least one inlet and at least one outlet, and the curing space and the receiving space are in air communication with each other through the least one inlet and the at least one outlet, wherein the light curing apparatus comprises a heating device arranged in the receiving space, and the heating device is configured to intake air from the at least one inlet and to exhaust air through the at least one outlet.

* * * * *